Nov. 20, 1923.  1,474,857
F. STEBLER ET AL
BOX HANDLING APPARATUS
Filed April 19, 1919   8 Sheets-Sheet 5
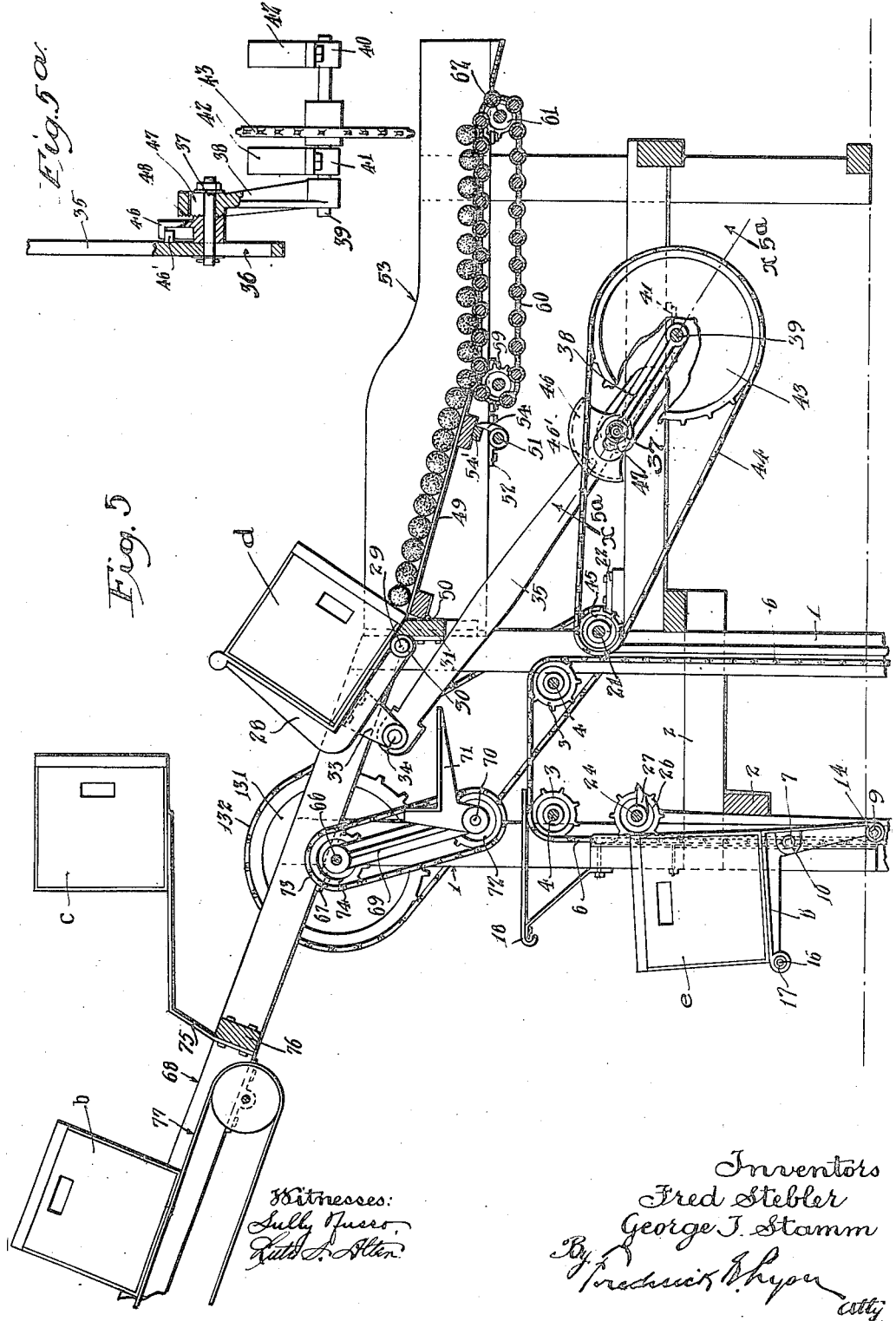
Witnesses:
Inventors
Fred Stebler
George T. Stamm
By Frederick P. Pryor
Atty

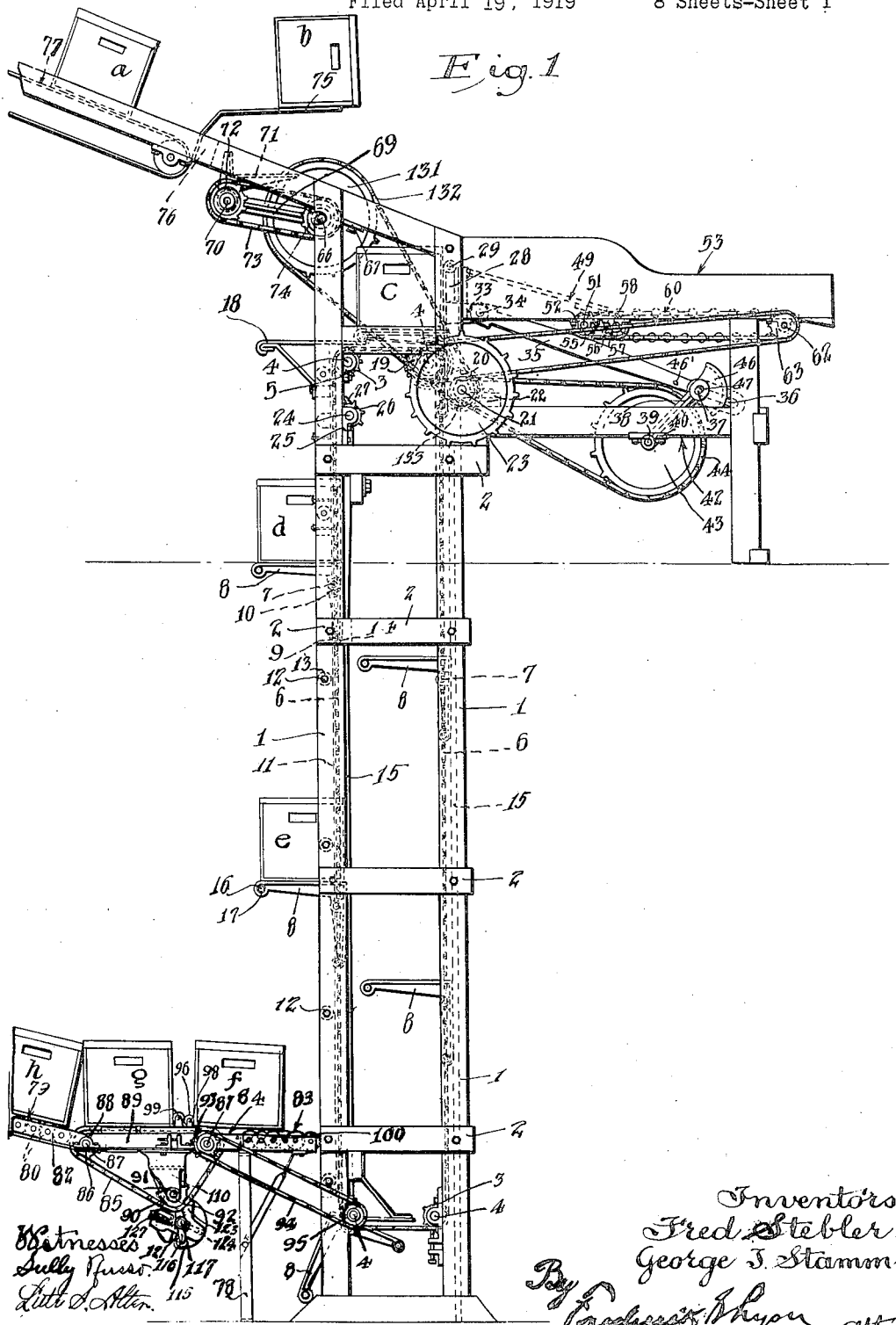

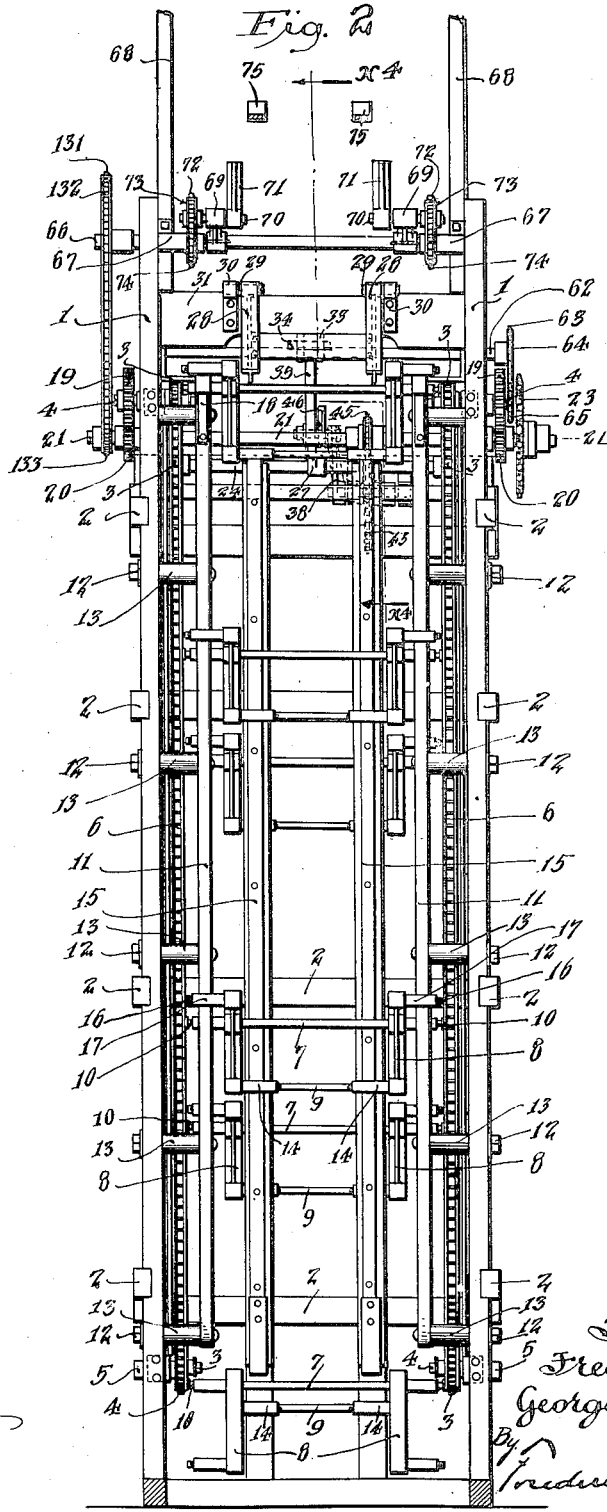

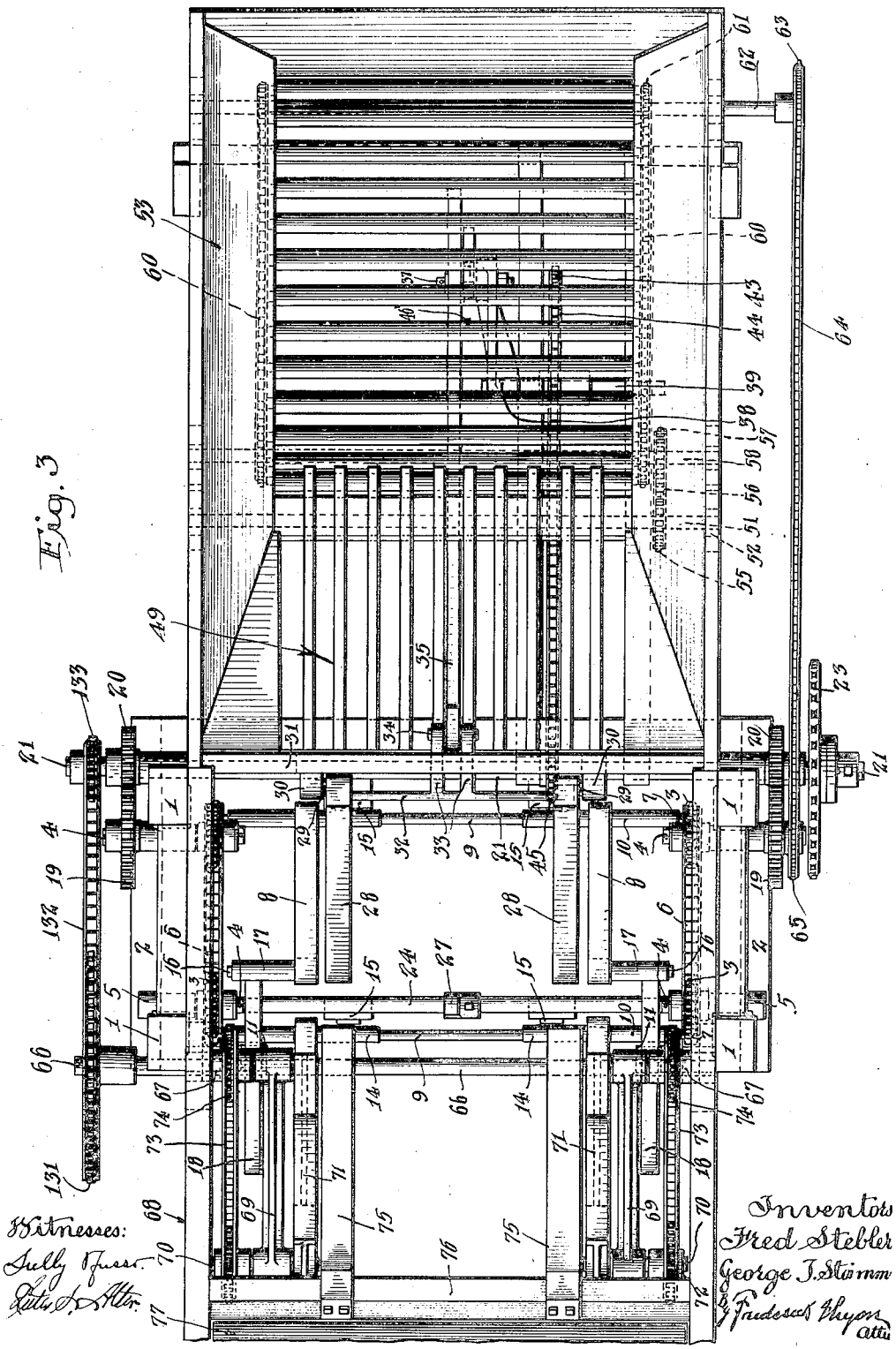

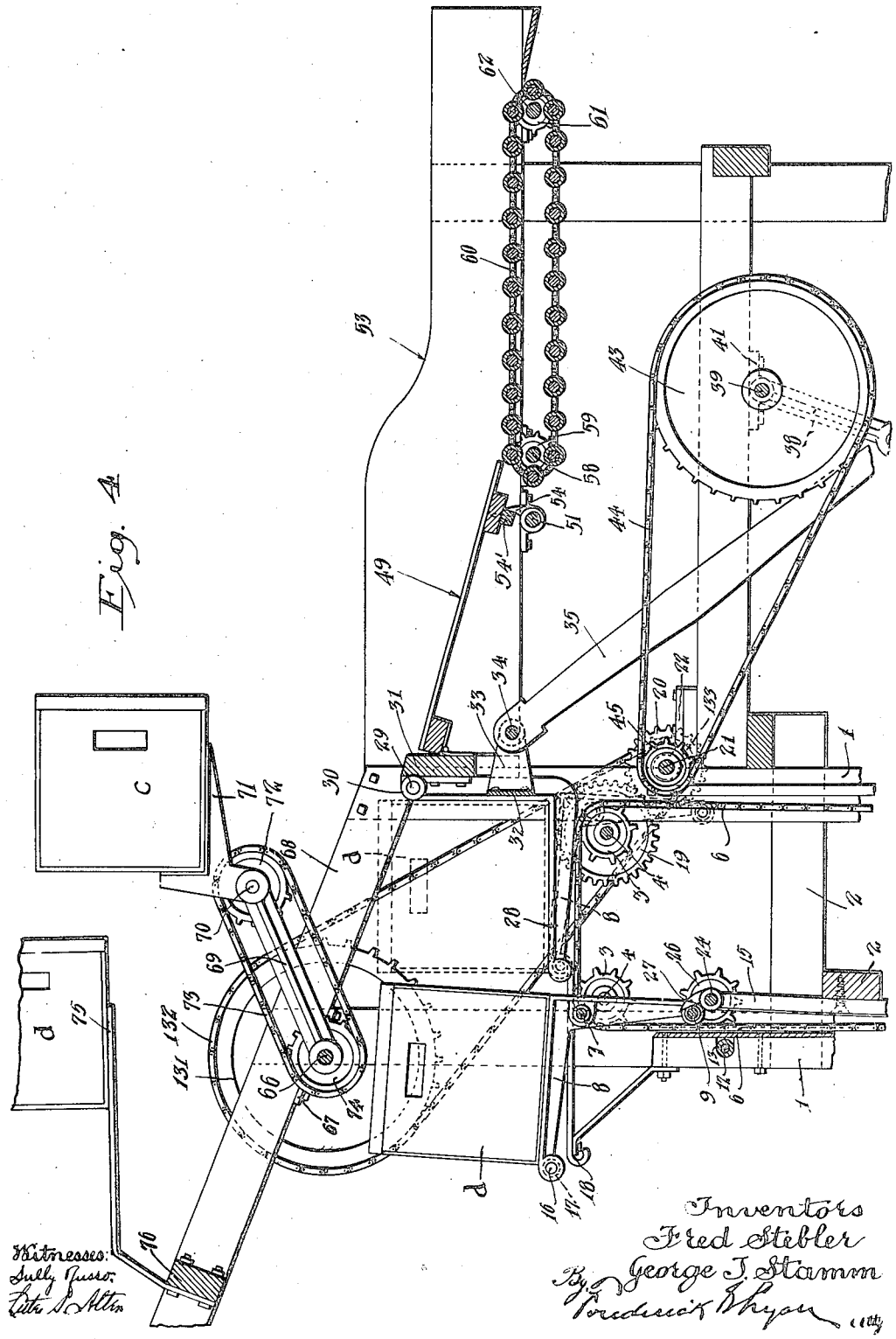

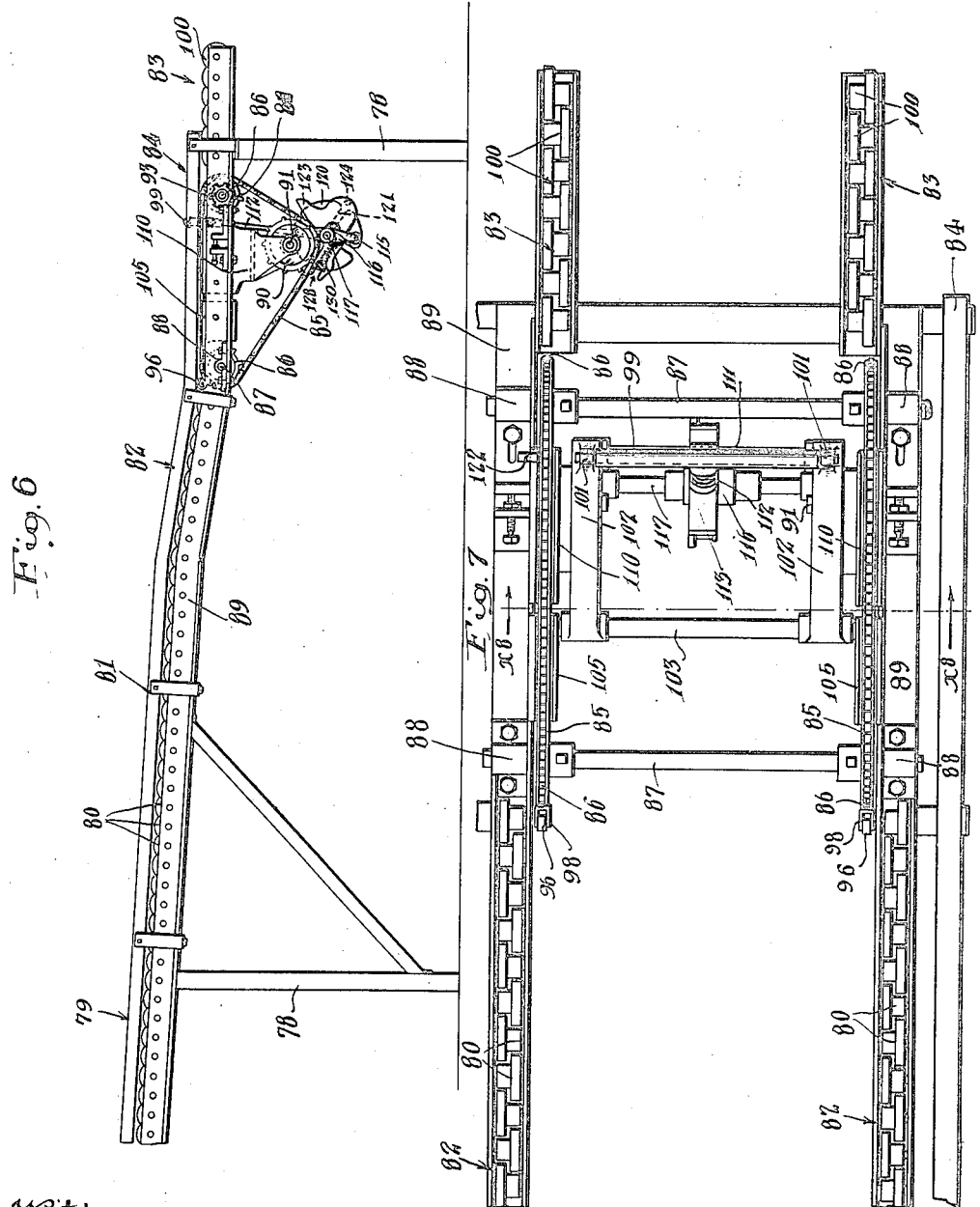

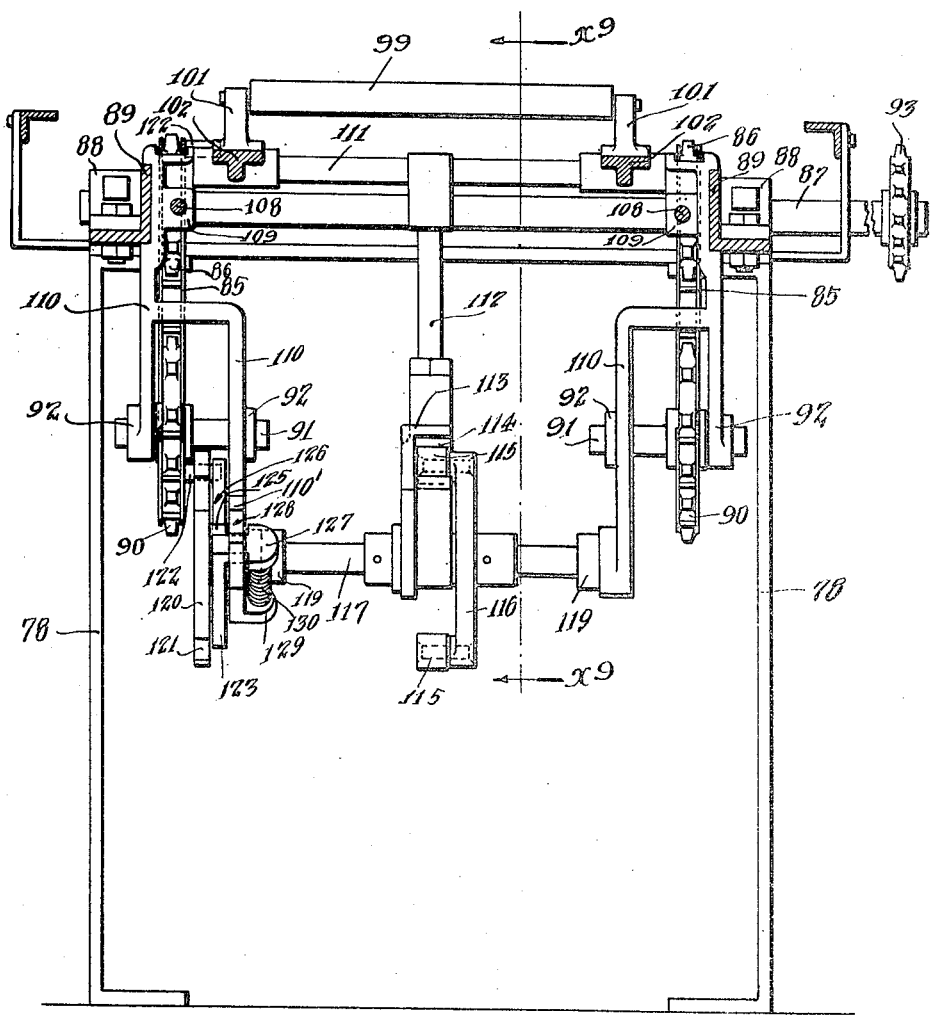

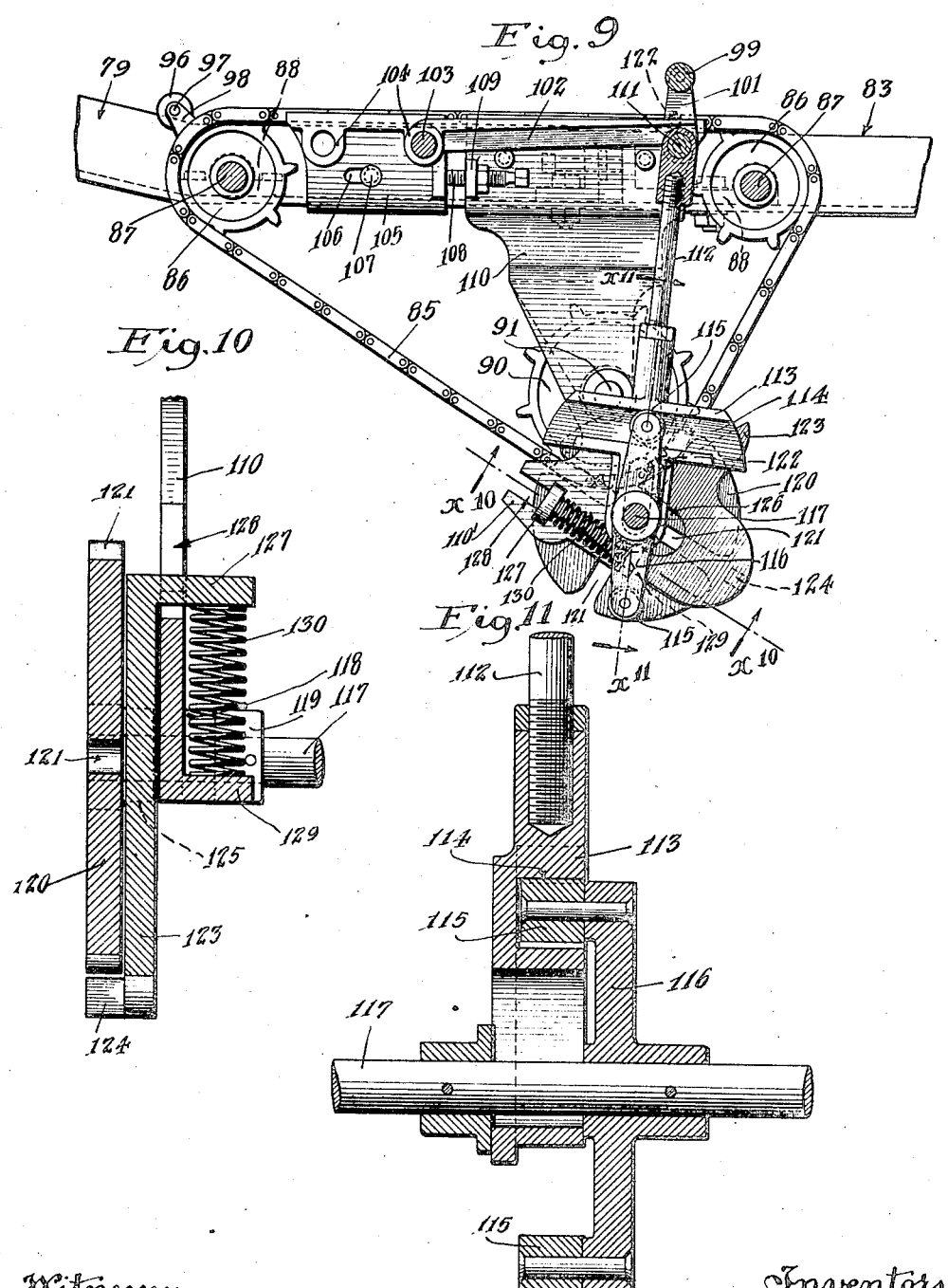

Patented Nov. 20, 1923.

1,474,857

UNITED STATES PATENT OFFICE.

FRED STEBLER, OF RIVERSIDE, AND GEORGE T. STAMM, OF UPLAND, CALIFORNIA, ASSIGNORS, BY DIRECT AND MESNE ASSIGNMENTS, TO STEBLER PARKER CO., OF RIVERSIDE, CALIFORNIA, A CORPORATION OF CALIFORNIA.

BOX-HANDLING APPARATUS.

Application filed April 19, 1919. Serial No. 291,243.

*To all whom it may concern:*

Be it known that we, FRED STEBLER and GEORGE T. STAMM, both citizens of the United States, residing, respectively, at Riverside, in the county of Riverside, and Upland, in the county of San Bernardino, and State of California, have invented a new and useful Box-Handling Apparatus, of which the following is a specification.

This invention relates to mechanism for receiving and positively feeding boxes one at a time, elevating the boxes to a given level, dumping the fruit or other contents of the boxes therefrom, and discharging the empty boxes onto a suitable conveyor.

An object of the invention is to effect the foregoing described operations by an apparatus that functions reliably and by one that is of comparatively simple construction when the various functions of the machine are taken into consideration.

One of the objects of the invention is to make provision for positively feeding boxes one at a time to an elevator so that the boxes being fed will not interfere with one another. In apparatus of this character of prior construction a gravity feed is depended upon to deposit the boxes one at a time on the elevator and, since there are no positive means to regulate the feed in the prior constructions, the boxes interfere with one another in such manner as to make the functioning of the elevator more or less imperfect. The invention overcomes this objection.

Another object of the invention is to make provision for transferring the boxes from the elevator to a box-dumping device.

Another object of the invention is to make provision for transfer of the bxes from the dumping device to a box discharging device.

Another object of the invention is to so construct the apparatus that the various mechanisms constituting the apparatus will be coordinated in action to a high degree so that the functioning of the apparatus will be as nearly perfect as possible, thus avoiding delays in the handling of the fruit or other contents of the boxes.

Other objects and advantages will appear in the subjoined detailed description.

The accompanying drawings illustrate the invention:

Figure 1 is a side elevation of an apparatus built in accordance with this invention, a portion of the feed mechanism being broken away to contract the view. This feed mechanism is shown in its entirety in Figs. 6 and 7.

Fig. 2 is a front elevation of Fig. 1, the feed mechanism being omitted and the discharge conveyer being partly broken away for clearness of illustration.

Fig. 3 is an enlarged plan view of Fig. 1, the feed mechanism being omitted and a portion of the discharge conveyer being broken away to contract the view.

Fig. 4 is an enlarged sectional elevation on line indicated by $x^4$—$x^4$, Fig. 2, the parts being in the positions shown in Fig. 1.

Fig. 5 is a sectional elevation analogous to Fig. 4 on a smaller scale than Fig. 4, showing the operating parts in different positions than in Fig. 4.

Fig. 5ª is a fragmental sectional elevation on line indicated by $x^{5a}$—$x^{5a}$, Fig. 5.

Fig. 6 is a side elevation of the feed mechanism intact and which is only partly shown in Fig. 1.

Fig. 7 is an enlarged plan view of the discharge end portion of the mechanism shown in Fig. 6.

Fig. 8 is an enlarged sectional elevation on line indicated by $x^8$—$x^8$, Fig. 7.

Fig. 9 is a sectional elevation on line indicated by $x^9$—$x^9$, Fig. 8.

Fig. 10 is an enlarged sectional detail on line indicated by $x^{10}$—$x^{10}$, Fig. 9.

Fig. 11 is an enlarged sectional detail on line indicated by $x^{11}$—$x^{11}$, Fig. 9.

First describing the elevating mechanism, there is provided a suitable frame comprising in this instance standards 1 and cross bars 2 joining the standards to one another. Mounted in pairs at both sides of the frame at the upper portion thereof and also at the lower portion are sprocket wheels 3 which are fixed on stub shafts 4 turning in bearings 5 that are fastened to the standards 1. At each side of the frame 1 and inside thereof are endless sprocket chains 6 which are rove around the sprocket wheels 3. At suitable intervals the sprocket chains 6 are provided with pivots 7 which connect the chain on one side with that on the other side. Journaled on each pivot 7 is a box support or carrier comprising a pair of bell crank levers 8 and a bar 9 connecting the lower ends of the levers with one another. The end portions of the pivots 7 project laterally beyond the outer faces of the levers 8 and are provided with rollers 10 which engage the rear faces of vertical guides 11 fastened by bolts 12 to the standards 1, there being tubular spacers 13 on the bolts to space the guides 11 from said standards. The guides 11 may be provided at the front of the frame only as shown in the drawings, though it is obvious that if desired they may also be provided at the rear of said frame. On each of the bars 9 adjacent the inner faces of the levers 8 are rotatively mounted rollers 14 adapted to engage and roll along the outer faces of vertical guides 15 positioned between the guides 11 and spaced therefrom. The guides 15 are arranged in two pairs one pair being at the front and the other pair being at the rear of the frame. When the box supports are at the front of the frame with the rollers 10 in engagement with the guides 11 and the rollers 14 in engagement with the guides 15 the upper arms of the bell crank levers 8 extend and are held substantially horizontal so that a box placed on any of the supports that are at the front of the frame will be substantially level and will not tend to slide off of said supports. The forward ends of the upper arms of the levers 8 are provided with laterally projecting studs 16 on which are journaled rollers 17 adapted to engage tracks 18 when the box supports are near the upper end of the frame.

For driving the elevator chains 6, two of the stub shafts 4 are provided with spur gears 19 meshing with gears 20 on a shaft 21 which extends from side to side of the frame and which is journaled in bearings 22 fastened to the rear standards 1. The shaft 21 is provided with a sprocket wheel 23 or other suitable means for receiving power so as to drive the shaft 21 and therefore drive the elevator chains. When the shaft 21 is driven in the appropriate direction it is clear that the box supports will ascend at the front of the frame and descend at the rear thereof and that the upper arms of the levers 8 will project forward in substantially a horizontal plane during the ascending and descending movements. When the rollers 14 reach the upper ends of the guides 15 in the upward movement of the box supports, said rollers will pass off of the ends of said guides and it is substantially at this moment that the rollers 17 move into engagement with the tracks 18.

To insure that the rollers 17 will be raised above the level of the upper surfaces of the tracks 18 and will not catch on the outer ends of said tracks, which are preferably curved as shown, means are provided to engage the bars 9 just before the rollers 14 leave the upper ends of the guides 15 and such means cause the rollers 17 to be elevated slightly above the level of the tracks 18 as in Fig. 4 until said rollers have passed rearward to position over said tracks and such means will now be described. Positioned immediately over the upper ends of the guides 15 is a horizontal shaft 24 which is journaled in bearings 25 mounted on the front standards 1. Fixed to the shaft 24 are sprocket wheels 26 which engage the sprocket chains 6 respectively so as to be driven by said sprocket chains. Fixed to the shaft 24 is an arm 27 which is adapted to be engaged by the appropriate bar 9 just before the rollers 14 of said bar leave the upper ends of the guides 15. The relation of the driving connections of the arm 27 to the spacing of the box supports is such that the arm 27 will be engaged by each of the bars 9 in turn as they come adjacent the upper ends of the guides 15. The arm 27 functions to prevent the bar 9 engaged therewith from swinging rearward so as to hold the levers 8 from rearward swinging for a certain period of time during which the pivots 7 change their direction of motion from the vertical to the horizontal and pass rearward over the front upper sprocket wheels 3. As clearly shown in Fig. 4, when this change of movement takes place, the rollers 17 are elevated somewhat above the level of the tracks 18 so that as said rollers move rearward they will do so above the level of the tracks and not strike the forward ends thereof. As the arm 27 turns away from the bar 9, it permits the lower arms of the levers 8 to swing rearward sufficiently to lower the rollers 17 upon the tracks 18.

From the foregoing it is seen that boxes placed on the box supports as said supports move upward at the front of the frame will be carried to adjacent the upper end of the frame and then rearward toward the back of the frame in a horizontal plane.

Dumping mechanism is provided to receive the boxes one at a time from the box supports and dump the boxes one at a time so as to discharge the contents therefrom and such mechanism will now be described. Positioned between the paths of travel of the levers 8 is a pair of L-shaped arms 28 which are provided with laterally projecting stub shafts 29 journaled in bearings 30 that are fastened to a cross bar 31 of the frame, said cross bar being fastened to the rear standards 1 and functioning as a stop to limit downward movement of the arms 28. The arms 28 are at the proper level to receive boxes from the supports 8, as said supports move rearward. Fastened to the arms 28 and connecting them to one another is a cross bar 32 having spaced ears 33 which are pivoted at 34 to a pitman 35. Suitable means are provided to reciprocate the pitman 35 to cause the arms 28 to swing upward and rearward so as to carry any box that may be resting on the arms into position for dumping the contents from said box rearward of the elevator. In the drawings these means are constructed as follows:

The pitman is provided at its lower end with a slot 36 through which extends a bolt 37 that projects from a crank arm 38 fixed to a shaft 39 rotatively mounted in bearings 40, 41 which are fastened to the under side of frame members 42. The shaft 39 is driven by a sprocket wheel 43 which in turn is driven by a sprocket chain 44 passing around a sprocket wheel 45 on the shaft 21, turning of the shaft 21 causing rotation of the crank arm 38 and consequent reciprocation of the pitman 35. The slot 36 permits of lost motion between the crank arm 38 and pitman 35 so that the arms 28 will be held stationary for an interval of time sufficient to allow a box to be deposited on said arms by the elevator box supports. It is advisable to have the pitman 35 return immediately from the position it assumes when the arms 28 are at their highest level and to effect this the bolt 37 passes through a shroud 46 which is positioned between the crank arm 38 and pitman 35. The bolt 37 serves to pivotally connect the pitman 35 to the crank arm 38 and to tightly hold the crank arm and shroud 46 together so that they will all function together as one member. The shroud 46 is adapted to engage a pin 46' on the pitman 35 when the pitman is at the end of its up stroke, and to pull downward on said pin as the crank arm 38 descends, thus to retrieve the pitman quickly. The pitman 35 and crank arm 38 are relatively adjustable and for this purpose the crank arm 38 is provided with a slot 47 through which the bolt 37 projects and by adjusting the crank arm and pitman relatively to one another the length of stroke of the pitman 35 may be varied at will so as to dump any box that may be on the arms 28 to a greater or less angle for discharging the contents of the boxes therefrom. Preferably the opposed faces of the crank arm 38 and shroud 46 are toothed or roughened as indicated at 48 so as to insure against slippage therebetween when the bolt 37 is tightened.

When the fruit or other contents of the boxes discharges therefrom, as clearly shown in Fig. 5, it falls on a downwardly and rearwardly sloping table 49 which is hinged at 50 to the cross bar 31. It may be desirable to jar or shake the table 49 to cause the fruit to pass rapidly downward on the table 49 so that the fruit already deposited on the table will not interfere with the discharge of fruit from the box. For this purpose a shaft 51 is journaled at 52 to the under side of a conveyer indicated in general by the character 53, and said shaft is provided with a finger 54 adapted at intervals to engage the under side of a wear block 54' fastened to the table 49 near the lower end thereof. To drive the shaft 51 it is provided with a sprocket wheel 55 operated by a sprocket chain 56 passing around a sprocket wheel 57 mounted on one of the conveyer shafts 58 of the conveyer 53. This shaft 58 is provided with sprocket wheels 59 for the conveyer chains 60 which also engage sprocket wheels 61 on a shaft 62. The shaft 62 is provided with another sprocket wheel 63 which is connected by an endless chain 64 to a sprocket wheel 65 mounted on one of the stub shafts 4 of the elevator, said stub shaft being driven as heretofore described and thus effecting rotation of the finger 54. The finger 54 thus becomes effective when the shaft 51 is turned to raise the lower end of the table 49 and then release it so as to jar or shake it.

The mechanism for picking up the boxes from the arms 28 will now be described. A shaft 66 is journaled in bearings 67 fastened to the under side of frame members 68 and fixed to said shaft and rotative therewith are arms 69 provided at their free ends with shafts 70 respectively. These shafts 70 are journaled in the arms 69 and fixed on said shafts are L-shaped box pick-up arms 71. The lower limbs of the arms 71 are adapted to extend in a horizontal plane at all times during the rotation of the arms 69 and, to effect this, sprocket wheels 72 are fixed to the shaft 70 and passing around said sprocket wheels are endless chains 73 which engage sprocket wheels 74 that are fixed to or formed integral with the bearings 67. It is now clear that when the shaft 66 is turned the arms 69 are caused to rotate about the axis of said shaft carrying with them the pick-up arms 71 which are maintained in horizontal position by reason of the sprocket wheels 72, 74 and sprocket chain 73. When the arms 69 are projecting vertically upward from the shaft 66, the pick-up arms 71 will obviously be at their maximum height and when in this position the box supporting surfaces of said arms 71 are slightly above the level of the box supporting surfaces of box receiving arms 75 which are positioned between the pick-up arms 71 and which are fastened at their forward ends to a cross bar 76 of the frame, said cross bar being supported by the frame members 68. The proportions of the parts just described are such that when a box is positioned on the pick-up arms 71 with one corner of the box seated in the angle of the pick-up arms said corner of the box will clear the forward ends of the box receiving arms 75 as the arms 71 carry the box upward and forward over the arms 75. Each box deposited successively on the box receiving arms 75 pushes the previously deposited box off of said arms and onto a suitable receiving conveyer 77, a fragment only of which is shown in the drawings. The shaft 66 is driven by a sprocket wheel 131 mounted thereon and engaging an endless chain 132 passing around a sprocket wheel 133 on the shaft 21.

The mechanism for positively feeding but one box at a time to the elevator will now be described. Mounted on suitable supports 78 is a gravity feed conveyer indicated in general by the character 79. The gravity conveyer 79 comprises rotatively mounted rollers 80 and the portion 81 of the conveyer slopes gently downward and rearward toward the elevator so that boxes placed thereon will be caused by gravity to roll upon the rollers 80 toward the elevator. Another portion 82 of the conveyer slopes downwardly and forwardly at a somewhat greater angle than the portion 81 for a reason to be hereinafter set forth. Another portion 83 of the conveyer is substantially level and is spaced from the portion 82, such space being indicated at 84. In the space 84 extending substantially from the conveyer portion 82 to the conveyer portion 83 are endless conveyer chains 85 mounted on sprockets 86 which are fast on shafts 87 journaled in bearings 88 that are mounted on the side members 89 of the conveyer 79. The chains 85 extend along the inner faces of the conveyer side members 89 and said chains also pass beneath sprocket wheels 90 fixed to shafts 91 journaled in bearings 92 on brackets 110 which are hung from the conveyer side members 89, as clearly shown in Fig. 8.

The rear conveyer shaft 87 is provided with a sprocket wheel 93 connected by an endless sprocket chain 94 with a sprocket wheel 95 mounted on one of the lower stub shafts 4 of the elevator, see Fig. 1. Thus the conveyer chains 85 are driven from the elevator. The conveyer chains 85 are provided with abutments in the form of rollers 96 each journaled at 97 in a bifurcated arm 98 on one of the links of the chain. These rollers 96 are adapted to engage the rear ends of the boxes as the chains 85 impel the boxes rearward toward the elevator. The rollers 96 will be impelled by the chains 85 into position between the box on the chains 85 and the next succeeding box so as to space said boxes slightly from one another in order that when the first named box is discharged from the chains 85 a roller 99 may be inserted between the discharged box and the next succeeding box as clearly shown in Fig. 1. This roller 99 functions to regulate the feed of the boxes to the portion 83 of the conveyer. The conveyer portion 83 constitutes a platform or table on which the boxes rest and from which the boxes are picked up by the elevator box supports 8, 9 that are impelled upward between the two rows of rollers 100 of the conveyer portion 83. Thus the box supports move upward in under the box and lift the same from the platform.

Means are provided to move the roller 99 up and down at the appropriate times so as to insert it in the space formed between adjacent boxes by the rollers 96 and so as to retract it to a position below the level of the horizontal runs of the chains 85 in order that the box on the chains 85 may be propelled rearward by said chains. In the instance shown in the drawings the means for reciprocating the roller 99 are constructed as follows: The roller 99 is rotatively mounted in bearings 101 on the rear ends of arms 102 respectively which are fixed at their forward ends to a shaft 103, journaled at each end in either one of bearings 104 that are carried by an adjustable slide 105. The adjustable slides 105 are provided with slots 106 through which extend bolts 107 projecting from the inner faces of the conveyer side members 89. The shaft 103 will be journaled in the rearmost bearings 104, when a longer box is to be accommodated between the roller 99 and the rollers 96, and, when a shorter box is to be accommodated between said rollers, said shaft 103 will be journaled in the forward bearings 104. The slides 105 may be adjusted horizontally by adjusting screws 108 which bear against the rear ends of the slides and which are screw-threaded in lugs 109 projecting inward from the brackets 110. By adjusting the screws 108 the distance between the rollers 96 and the roller 99 may be increased or diminished to some extent irrespective of whether the shaft 103 is positioned in the front or rear bearings 104. The arms 102 are connected together at their rear ends by a rod 111 which serves to pivot the arms to an adjustable pitman 112. This pitman 112 at its lower end forms a head 113 having a way 114 for rollers 115 rotatively mounted on the outer ends of crank arms 116 fixed to a shaft 117. The crank arms 116 are arranged diametrically opposite to one another and the way 114 is so constructed that when the shaft 117 is turned the rollers 115 will alternatively enter the way at one end, push the pitman 112 upward, move the pitman 112 downward and then leave the way 114. The shaft 117 is rotated in a step by step movement so that the roller 99 will be held for a sufficient length of time below the level of the upper run of the chains 85 to allow a box to pass from in front of the roller 99 to the rear thereof and so that the roller 99 will be held for an interval of time above the level of the chains 85 to prevent the box on the chains 85 from moving onto the table 83 before the box on the table has been lifted above the level of the box on the chains, and these means will now be described. The shaft 117 is journaled in bearings 118 on the brackets 110, there being collars 119 on said shaft bearing against the inner faces of the bearings 118 to prevent endwise movement of said shaft. To one end of the shaft 117 is fixed a rotary member in the form of a disk 120 having radially extending slots 121 adapted to be engaged one at a time by either one of pins 122 on the adjacent chain 85 when the pin comes adjacent the sprocket wheel 90 engaging the chain on which the pins are mounted. The slots 121 may be of any number desired, and in the drawings there are shown four such slots quartered or arranged at 90° of circular measurement from one another. The portions of the chain 25 adjacent the slotted disk 120 extend from the sprockets 86 to the sprocket 90 in planes that are substantially 90° of circular measurement from one another so that either of the pins 122 will readily enter the outer end of any one of the slots 121 in register with said pin, then move the disk 120 through an angle of 90° and then leave the slot. Thus it is clear since there are two pins 122 in this instance that for every revolution of the chain 85 the disk 120 is turned through an angle of 180°.

The momentum given to the disk 120 by the pin 122 might cause the disk 120 to rotate more than 90° at one time if no means were provided to prevent it and such means have been provided and will now be described. The pin 122 as it moves downward in any one of the slots 121 which it happens to engage engages the edge of a latch plate 123 carrying a lug 124 adapted to engage any one of the slots 121 that may at the time be in registration with the lug, the position of the lug 124 being such that it is in line with one of the slots 121 when the pin 122 engages another of said slots. The plate 123 is shiftably mounted on the hub 125 of the slotted disk 120 and for this purpose is provided with a slot 126 to accommodate the hub 125. The locking plate 123 is provided with an ear 127 projecting through a slot 128 in an extension 110′ of one of the brackets 110. Thus this bracket and its ear 127 prevent rotation of the locking plate 123 and allow said locking plate to be shifted and the ear guides the plate. Between the ear 127 and a lug 129 on the bracket extension 110′ is a coil spring 130 which is put under compression when the locking plate 123 is moved in a direction to retract the lug 124 from the appropriate slot 121. Thus it is clear that when the pin 122 moves past the locking plate 123 and out of engagement therewith so as to release it the lug 124 will ride on the periphery of the disk 120 until the next succeeding slot 121 comes into registration with said lug, whereupon the expansive force of the spring 130 will operate to retract the locking plate 123 to move the lug 124 into the adjacent slot 121, thus stopping rotation of the disk 120 and preventing further rotation thereof until the other pin 122 again engages the locking plate 123 to retract the lug 124 from the slot 121.

In practical operation, assuming that power has been applied to the sprocket wheel 23 to drive the apparatus and assuming at the start that boxes a, b, c, d, e, f, g and h are positioned in the apparatus as in Fig. 1, the pusher roller 99 has just risen so as to hold box g from advancing any farther toward the elevator. The box f at the same time is moved by the rollers 96 into the path of upward movement of the elevator levers 8 which operate to pick up the box f and elevate it. The rollers 99 retain the box g until the box f has been raised out of the horizontal path of movement of the box g. Thereupon one of the pins 122 engages the plate 123 and moves it out of locking position as in Fig. 9. The pin 122 thus unlocking the plate 123 continues to move and rotates the disk 120 through an angle of 90°, whereupon the lug 124 engages the appropriate slot 121 to lock the disk against further movement as in Fig. 1. This quarter rotation of the disk 120 turns the shaft 117 one quarter of a revolution so as to cause one of the crank arms 116 to retract the pitman 112 and thereby retract the roller 99 from engagement with the box g.

When the roller 99 has been thus retracted the box g is impelled by the chains 85 and rollers 96 toward the conveyer. By the time that the box g has passed to the rear of the roller 99, the second pin 122 has come into position to engage the locking plate 123 and rotate the disk 120 another quarter of a turn. This turning of the disk 120 has caused upward movement of the pitman 112 to move the roller 99 to position in rear of the next succeeding box h which meantime has taken the place of the box g on the chains 85. This box h is stopped by the roller 99. The box g continues to move toward the elevator and by the time it is in correct position on the table 83 for elevating one of the elevator box supports engages and raises the box g as above described for the preceding box f. The boxes c, d, and e have of course been previously fed to the elevating mechanism the same as the boxes g, h as just described.

When the box d has been raised to substantially the level of the arms 28 or, in reality, slightly above said level, the elevator box support carrying said box moves from the position shown in Fig. 4 to a position corresponding to that shown in broken lines in Fig. 4 whereupon the pitman 35 is actuated upward, thus carrying the box $d$ upward and tipping it rearward toward the table 49 to the position shown in Fig. 5. This tipping of the box $d$ causes the fruit or other contents of the box to be discharged therefrom onto the table 49 which is constantly being agitated or jarred as heretofore described. The fruit or other material thus dumped onto the table 49 discharges therefrom onto the conveyer 53 and said conveyer carries the fruit or other material away to the grader or wherever else desired.

As soon as the arms 28 have reached the upper limit of their up-stroke, retraction of said arms is begun by downward movement of the pitman 35, thus carrying the emptied box $d$ downward. About the time that the lower side of the box $d$ is in a horizontal plane, the arms 71 are swung upward under said box $d$. As the arms 71 and the arms 28 pass one another the box $d$ is picked up from the arms 28 by the arms 71 and carried upward and forward to position above the arms 75, the arms 71 at the same time pushing the preceding box $c$ forward on the arms 75. The arms 71 continue to rotate about the shaft 66 thus lowering the emptied box $d$ onto the arms 75 and pushing the preceding box $c$ from the arms 75 onto the conveyer. The next succeeding box $e$ on the elevator is handled in the same manner and the arms 71 serve to push the preceding box $d$ forward off of the arms 75 while depositing the box $e$ on said arms. When the boxes discharge from the arms 75 onto the conveyer 77 they turn into upright position owing to said arms 75 being above the level of the conveyer 77, and the boxes are then ready for refilling.

From the foregoing description of the operation it will be seen that the fruit or other contents of the boxes is carefully handled by the apparatus as are also the empty boxes after the fruit has been discharged therefrom. There is no dropping of the fruit and boxes which would tend to injure them, but the boxes are fed evenly at slight intervals to the elevating mechanism, elevated, tipped and the fruit carefully dumped therefrom, and then the empty boxes are carried away from the dumping mechanism and deposited on members adapted to receive them. When the boxes are pushed from the arms 75 they discharge onto the conveyer 77 and are carried by said conveyer to any desired place for refilling.

It is to be understood that the machine though consisting of a number of differently functioning mechanisms, is in reality but a single machine, since the various mechanisms are coordinated in action like the different mechanisms of any complex type of machine. It is especially to be noted that the boxes are not fed by gravity to the table from which they are elevated but that they are positively fed one at a time in timed relation with the elevator supports which remove the boxes from the table.

It will be clear that the elevator chains 6 travel in rectilinear paths; and that the arms 28 are mounted on the frame in position to receive a box or other object from the carrier as said carrier travels from the upper end of its ascending path to the upper end of its descending path, thus the elevator moves the object upon the arms 28 and then the carrier moves downwardly away from said arms so as to leave the object resting upon said arms.

The invention is not limited in its broader aspects to the exact construction described above and shown in the drawings, but the invention includes such changes and modifications as lie within the spirit and scope of the appended claims.

We claim:

1. In a box handling apparatus, a frame, endless chains at the sides of the frame, means to drive said chains, bell crank levers pivoted to each of the chains, the pivots of the levers projecting laterally beyond the outer faces of said levers, bars connecting the bell crank levers on one chain with those on the other chain, two pairs of vertical guides at the front of the frame fastened thereto, one pair being positioned between the guides of the other pair, rollers on the projecting ends of the pivots engaging the rear faces of one pair of guides, and other rollers on the bars adjacent the inner faces of the levers engaging the front faces of the other pair of the guides.

2. In a box handling apparatus, a frame, endless chains at the sides of the frame, means to drive said chains, bell crank levers pivoted to each of the chains, one arm of each lever extending substantially horizontal from the upper end of the other arm of the lever, bars connecting the bell crank levers on one chain with those on the other chain, two pairs of vertical guides at the front of the frame fastened thereto, rollers on the bell crank pivots engaging the rear faces of one pair of said guides, other rollers on the bars engaging the front faces of the other pair of the guides, a roller at the outer end of the horizontal arm of each bell crank lever, tracks at the upper portion of the frame, means engaging the lever bars when the rollers on said bars are at the upper ends of their guides to hold the levers in box-supporting position as said rollers leave their guides, and tracks at the upper portion of the frame adapted to be engaged by the third named rollers when the bars have moved out of engagement with said holding means.

3. In a box handling apparatus, a frame, endless chains at the sides of the frame, means to drive said chains, bell crank levers pivoted to each of the chains, one arm of each lever extending substantially horizontal from the upper end of the other arm of the lever, means to hold the bell crank levers in box-supporting position as they move upward, said means including bars connecting the levers on one chain with those on the other chain, a roller at the outer end of the horizontal arm of each bell crank lever, means engaging the lever bars to hold the levers in box-supporting position at the end of the upward movement of said levers, and tracks at the upper portion of the frame adapted to be engaged by the rollers when the bars have moved out of engagement with said holding means.

4. In a box handling apparatus, a frame, endless chains at the sides of the frame, means to operate the endless chains, bell crank levers pivoted to each of the chains, one arm of each lever extending substantially horizontal from the upper end of the other arm of the lever, bars connecting the levers on one chain with the levers on the other chain, rollers on the bars, vertical guides at the front of the frame for the rollers, rollers on the pivots of the levers, other vertical guides at the front of the frame for the last named rollers, a roller at the upper end of each bell crank lever, tracks near the outer end of the horizontal arm of the frame, a shaft journaled on the frame, a sprocket wheel on the shaft operated by one of the endless chains, and an arm on the shaft adapted to engage the bars one at a time when the bars reach the upper ends of the first named guides to prevent the bars from swinging rearward before the last named rollers are over the tracks.

5. In a box handling apparatus, a frame, endless chains at the sides of the frame, means to operate the endless chains, means on the chains to carry a box, arms movably mounted on the frame in position to receive a box from the box carrying means when said means are at the end of their upward movement, and means to move said arms upward and rearward to dump the contents of the box therefrom.

6. In a box handling apparatus, a frame, endless chains at the sides of the frame, means to operate the endless chains, means on the chains to carry a box, arms pivoted to the frame in position to receive a box from the box carrying means when said means are at the end of their upward movement, and means to swing the arms upward and rearward to dump the contents of the box therefrom.

7. In a box handling apparatus, a frame, endless chains at the sides of the frame, means to operate the endless chains, means on the chains to carry a box, arms pivoted to the frame in position to receive a box from the box carrying means when said means are at the end of their upward movement, means to limit the downward movement of the arms, a pitman connected with the arms, and means to reciprocate the pitman, the last named means being inoperative to move the pitman for an interval of time when the arms are at the lower limit of their movement.

8. In a box handling apparatus, a frame, endless chains at the sides of the frame, means to operate the endless chains, means on the chains to carry a box, arms movably mounted on the frame in position to receive a box from the box carrying means when said means are at the end of their upward movement, means to move said arms upward and rearward to dump the contents of the box therefrom and to then lower the arms, and means operating to pick the empty box from the arms as said arms are being lowered.

9. In a box handling apparatus, a frame, endless chains at the sides of the frame, means to operate the endless chains, means on the chains to carry a box, arms pivoted to the frame in position to receive a box from the box carrying means when said means are at the end of their upward movement, means to swing the arms upward and rearward to dump the contents of the box therefrom and to then lower the arms, and means operating to pick the empty box from the arms as said arms are being lowered.

10. In a box handling apparatus, a frame, arms movably mounted on the frame and adapted to support a box, means to move the arms upward and rearward to tip the box and to then lower the arms, and means operating to pick the empty box from the arms as said arms are being lowered.

11. In a box handling apparatus, a frame, arms pivoted to the frame and adapted to support a box, means to swing the arms upward and rearward to tip the box and to then swing the arms downward, and means operating to pick the empty box from the arms as said arms are being swung downward.

12. In a box handling apparatus, a frame, arms pivoted to the frame and adapted to support a box, means to swing the arms upward and rearward to tip the box and to then swing the arms downward, other arms movably mounted on the frame, and means operating during the downward swinging of the first named arms to move the last named arms upward past the first named arms.

13. In a box handling apparatus, a frame, arms movably mounted on the frame and adapted to support a box, means to swing the arms upward and rearward to tip the box and to then swing the arms downward, a shaft journaled on the frame, means to turn the shaft, crank arms fixed to the shaft, stub shafts journaled in the free ends of the crank arms respectively, other arms fixed to the stub shafts respectively and adapted to pass the first named arms when the crank shaft is turned, and means to turn the stub shafts in the opposite direction to that of the turning of the first named shaft to hold the third named arms in box-supporting position at all times.

14. In a box handling apparatus, a frame, arms movably mounted on the frame and adapted to support a box, means to swing the arms upward and rearward to tip the box and to then swing the arms downward, a shaft journaled on the frame, means to turn the shaft, crank arms fixed to the shaft, stub shafts journaled in the free ends of the crank arms respectively, other arms fixed to the stub shafts respectively and adapted to pass the first named arms when the crank shaft is turned, a sprocket wheel fixed to each of the stub shafts, stationarily mounted sprocket wheels in axial alinement with the first named shaft, and endless chains connecting the first named sprocket wheels to the second named sprocket wheels.

15. In a box handling apparatus, a frame, arms movably mounted on the frame, means to carry a box onto said arms, means to move the arms downward, other arms, means to move the last named arms in a circle upward past the first named arms as said first named arms move downward to pick the box off of the first named arms, and still other arms positioned to receive the box from the second named arms as said second named arms move forward and downward.

16. In a box handling apparatus, a frame, arms movably mounted on the frame, means to carry a box onto said arms, means to move the arms upward and rearward to tip the box and to then move the arms downward, other arms, means to move the last named arms in a circle upward past the first named arms as said first named arms move downward to pick the box off of the first named arms, still other arms positioned to receive the box from the second named arms as said second named arms move forward and downward, the second named arms being constructed to push said box forward off of said third named arms in the next subsequent rotation of the second named arms, and a conveyer leading from adjacent the front ends of the third named arms to receive and convey the box away from the third named arms.

17. In a box handling apparatus, a frame, arms movably mounted on the frame, means to carry a box onto said arms, means to move the arms upward and rearward to tip the box to dump the contents from the box and to then lower the arms, means to pick the empty box from the arms while they are being lowered, a rearwardly and downwardly inclined table movably mounted on the frame rearward of the arms to receive the contents of the box when the box is tipped, means to shake the table to cause the contents thereof to discharge therefrom, and means rearward of the table to receive and convey the contents discharging from the table.

18. In a box handling apparatus, a frame, box-elevating means on the frame, positive means to feed boxes one at a time to the box-elevating means, means extending in the path of travel of the boxes on the box-elevating means to receive the boxes one at a time, and means to move the box-receiving means upward and rearward to tip the box thereon.

19. In a box handling apparatus, a frame, box-elevating means on the frame, positive means to feed boxes one at a time to the box-elevating means, means extending in the path of travel of the boxes on the box-elevating means to receive the boxes one at a time, means to move the box-receiving means upward and rearward to tip the box thereon and to then lower the box-receiving means, and means to pick the empty box off of the box-receiving means during the downward movement of the box-receiving means.

20. In a box handling apparatus, box-elevating means having upwardly moving box-supports, and a conveyor extending to the lower end of the box-elevating means, said conveyor having a substantially level portion comprising longitudinal rows of rollers at the sides of the path of motion of the box supports, and means positioned adjacent the rollers and operating in timed relation with the box-elevating means to receive a box and positively propel said box onto the rollers.

21. In a box handling apparatus, box elevating means, means extending to the lower end of the box-elevating means to feed boxes one at a time to the box-elevating means, means at the upper end of the box-elevating means to receive and tip the boxes, and means to pick the boxes off of the box-tipping means and discharge the boxes.

22. In a box handling apparatus, box elevating means, means at the upper end of the box-elevating means to receive boxes from the elevating means one at a time and tip them rearward to dump the contents of the boxes therefrom, and means to discharge the empty boxes forward from the box tipping means.

23. In a box handling apparatus, a frame, box-elevating means on the frame, a gravity conveyor having two spaced sections, one of said sections lying adjacent to the box elevating means, and means positioned in the space and operating with the box-elevating means to receive the box nearest to the box-elevating means from the conveyor section farthest from said box-elevating means and to positively carry said box onto the conveyor section lying adjacent to the box-elevating means and to prevent the advance of the next succeeding box while the first box is being advanced, the box-elevating means picking up the first box from the second conveyor section and elevating it to a predetermined level while the next succeeding box is stationary.

24. In a box handling apparatus, a frame, box-elevating means on the frame, arms movably mounted on the frame in position to receive a box from the box-elevating means when said means are at the end of their upward movement, means to move said arms upward and rearward to dump the contents of the box therefrom and to then lower the arms, and means operating to pick the empty box from the arms as said arms are being lowered.

25. In a box handling apparatus, a frame, box-elevating means on the frame, means to convey a string of boxes toward the box-elevating means, means to feed the box nearest to the box-elevating means thereto and to prevent the advance of the next succeeding box while the first box is being advanced, the box-elevating means picking up the box thus advanced and elevating it to a predetermined level while the next succeeding box is stationary, means to receive the box from the box-elevating means and to dump the box, and means to pick the empty box from the box-dumping means.

26. In an elevator, a frame, endless chains at opposite sides of the frame, means to operate the chains, a carrier pivotally connected with the chains, means on the frame engaging the carrier as it travels in its ascending path to prevent tilting of the carrier, other means on the frame engaging the carrier as it travels from the upper end of its ascending path to the upper end of its descending path to prevent tilting of the carrier, and arms mounted on the frame in position to receive an object from the carrier as said carrier travels from the upper end of its ascending path to the upper end of its descending path.

27. In an elevator, a frame, endless chains at opposite sides of the frame, means to operate the chains, a carrier mounted on the chains, and arms mounted on the frame in position to receive an object directly from the carrier as said carrier travels from the upper end of its ascending path to the upper end of its descending path, said arms being in a plane through which the carrier passes.

In testimony whereof, we have hereunto set our hands at Riverside, California, this 3d day of April, 1919.

FRED STEBLER.
GEO. T. STAMM.

In presence of—
 THEO. D. HURD,
 R. T. SULLIVAN.